United States Patent [19]
Jung

[11] Patent Number: 6,020,925
[45] Date of Patent: Feb. 1, 2000

[54] METHOD AND APPARATUS FOR ENCODING A VIDEO SIGNAL USING PIXEL-BY-PIXEL MOTION PREDICTION

[75] Inventor: Hae-Mook Jung, Seoul, Rep. of Korea

[73] Assignee: Daewoo Electronics Co., Ltd., Rep. of Korea

[21] Appl. No.: 08/858,718

[22] Filed: May 19, 1997

Related U.S. Application Data

[63] Continuation-in-part of application No. 08/367,520, Dec. 30, 1994, abandoned.

[51] Int. Cl.[7] ....................................................... H04N 7/32
[52] U.S. Cl. ............................................. 348/416; 348/699
[58] Field of Search ............................. 348/390, 400–403, 348/407, 409–413, 415, 416, 420, 699; 382/232, 236, 238, 241–243; H04N 7/32

[56] References Cited

U.S. PATENT DOCUMENTS

| | | | |
|---|---|---|---|
| 4,951,140 | 8/1990 | Ueno et al. ............................. | 348/413 |
| 4,958,226 | 9/1990 | Haskell et al. ......................... | 348/416 |
| 5,295,201 | 3/1994 | Yokohama .............................. | 348/416 |
| 5,398,068 | 3/1995 | Liu et al. ............................... | 348/416 |
| 5,537,155 | 7/1996 | O'Connell et al. ..................... | 348/699 |
| 5,592,228 | 1/1997 | Dachiku et al. ........................ | 348/416 |
| 5,729,295 | 3/1998 | Okada .................................... | 348/420 |

*Primary Examiner*—Richard Lee
*Attorney, Agent, or Firm*—Anderson Kill & Olick

[57] ABSTRACT

An apparatus, for use in a motion-compensated video signal encoder, for determining a predicted current frame based on a current frame and a previous frame of a digital video signal, including: a unit for selecting a number of pixels from the pixels contained in the previous frame; a unit for detecting a first set of motion vectors between the current and the previous frames, each of the first set of motion vectors representing a motion for each of the selected pixels; a unit for producing a second set of motion vectors for all of the pixels contained in the current frame by using the first set of motion vectors; and a unit for assigning the value of each of the pixels in the previous frame, which corresponds to one of the pixels in the current frame through one of the second set of motion vectors, as the value of the one of the pixels in the current frame.

16 Claims, 4 Drawing Sheets

FEATURE POINT

FEATURE POINT

FEATURE POINT

FEATURE POINT

QUASI-FEATURE POINT

METHOD AND APPARATUS FOR ENCODING A VIDEO SIGNAL USING PIXEL-BY-PIXEL MOTION PREDICTION

CROSS REFERENCE TO RELATED APPLICATION

This application is a continuation-in-part of U.S. Ser. No. 08/367,520 filed on Dec. 30, 1994 now abandoned.

FIELD OF THE INVENTION

The present invention relates to a method and an apparatus for encoding a video signal; and, more particularly, to a method and an apparatus for encoding a video signal using a pixel-by-pixel motion prediction technique.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object. Generally, they can be classified into two types: one is a block-by-block estimation and the other is a pixel-by-pixel approach.

In the block-by-block motion estimation, a block in a current frame is compared with blocks in its previous frame until a best match is determined. From this an interframe displacement vector (how much the block of pixels has moved between frames) for the whole block can be estimated for the current frame being transmitted. However, in the block-by-block motion estimation, blocking effect at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vectors to a receiver.

SUMMARY OF THE INVENTION

It is, therefore, a primary object of the invention to provide an improved motion estimation and compensation technique on a pixel-by-pixel basis using feature points in accordance with the present invention.

In accordance with the invention, there is provided an apparatus, for use in a motion-compensated video signal encoder, for determining a predicted current frame based on a current frame and a previous frame of a digital video signal, comprising:

means for selecting a number of feature point pixels from the previous frame, wherein each of the feature point pixels represents a pixel contained in the previous frame, the feature point pixels being capable of representing the motion of an object in the digital video signal;

means for detecting a first set of motion vectors for the feature point pixels contained in the previous frame on a pixel-by-pixel basis by using the current frame, wherein each of the first set of motion vectors is a spatial displacement between a corresponding feature point pixel in the previous frame and a most similar pixel contained in the current frame to the corresponding feature point pixel frame;

means for producing a second set of motion vectors for all of pixels contained in the current frame by using said first set of motion vectors, wherein said producing means includes:

first means for determining, by using the first set of motion vectors, a third set of motion vectors for quasi-feature point pixels contained in the current frame, wherein the quasi-feature point pixels represent a number of pixels of the current frame shifted from the feature point pixels of the previous frame by the first set of motion vectors; and second means for determining a fourth set of motion vectors for remaining pixels of the current frame by using the third set of motion vectors to produce the third and the fourth set of motion vectors as the second set of motion vectors, wherein each of the fourth set of motion vectors is determined by averaging motion vectors of quasi-feature point pixels contained in a predetermined range about a corresponding remaining pixel; and means for assigning the value of each of the pixels in the previous frame, which corresponds to one of the pixels in the current frame through one of the second set of motion vectors, as the value of said one of the pixels in the current frame, to thereby determine the predicted current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
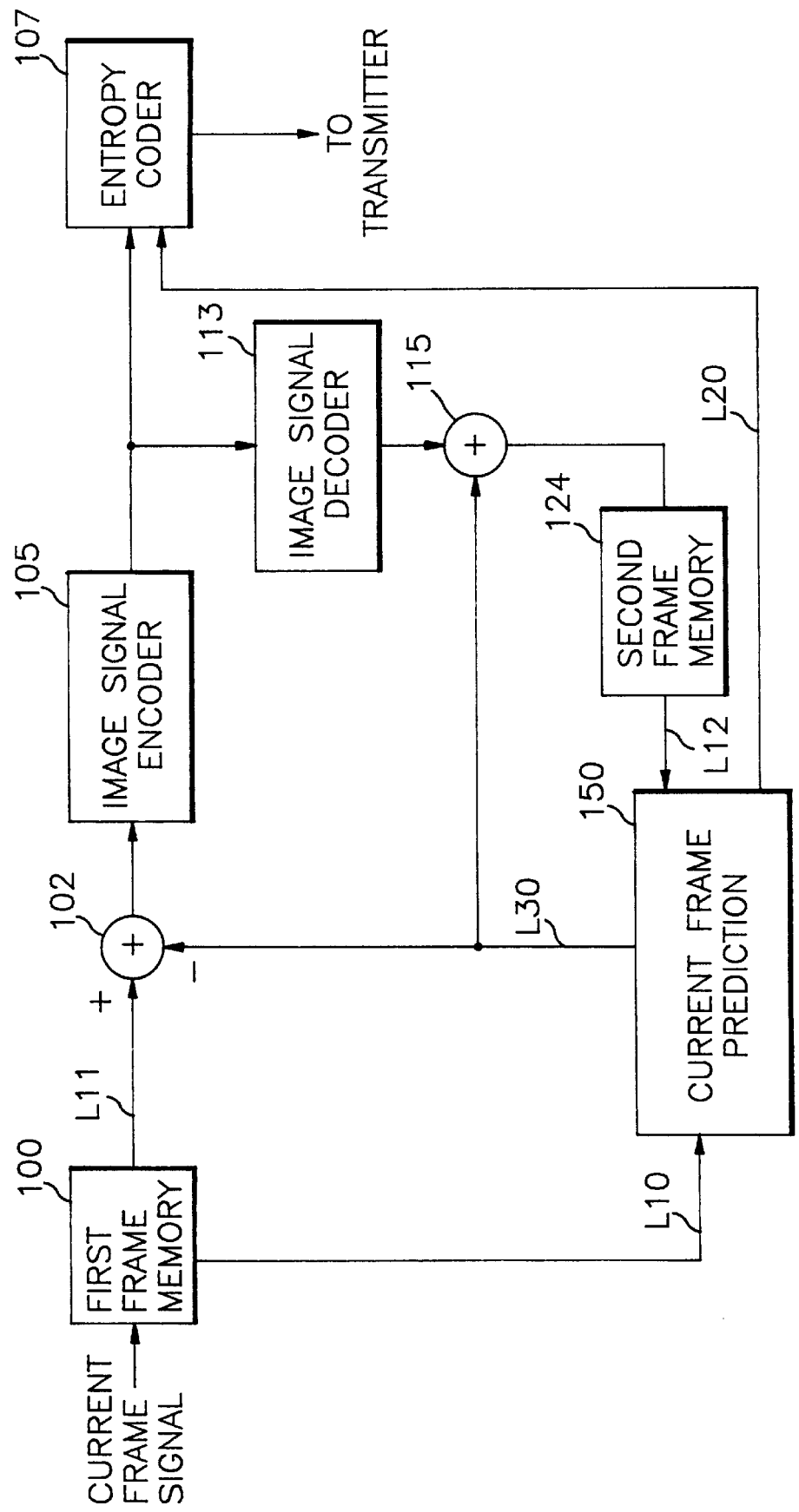
FIG. 1 is an image signal encoding apparatus having a current frame prediction block in accordance with the present invention.

FIG. 1 describes a preferred embodiment of an image signal encoding apparatus having a current frame prediction block of the present invention. As shown in FIG. 1, a current frame signal is stored in a first frame memory 100 which is connected to a subtractor 102 through a line L11 and to a current frame prediction block 150 through a line L10.

In the current frame prediction block 150, a current frame signal on a line L10 retrieved from the first frame memory 100 and a reconstructed previous frame signal on a line L12 from a second frame memory 124 are processed to predict the current frame on a pixel-by-pixel basis to generate a predicted current frame signal onto a line L30 and a set of motion vectors for feature points onto a line L20. Details of the current frame prediction block 150 will be described with reference to FIGS. 2 and 3.

The predicted current frame signal on the line L30 is subtracted from a current frame signal on the line L11 at the subtractor 102, and the resultant data, i.e., an error signal denoting a differential pixel value, is dispatched to an image signal encoder 105, wherein the error signal is encoded into a set of quantized transform coefficients, e.g., by using a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the current frame prediction block 150 are coded together by using, e.g., a variable length coding technique; and transmitted to a transmitter(not shown) for the transmission thereof. In the meantime, the image signal decoder 113 converts the quantized transform coefficients from the image signal decoder 105 back into a reconstructed error signal by employing an inverse quantization and an inverse discrete cosine transform.

The reconstructed error signal from the image signal decoder 113 and the predicted current frame signal on the line L30 from the current frame prediction block 150 are combined at an adder 115 to thereby provide a reconstructed current frame signal to be stored as a previous frame in the second frame memory 124.

Figure 2:
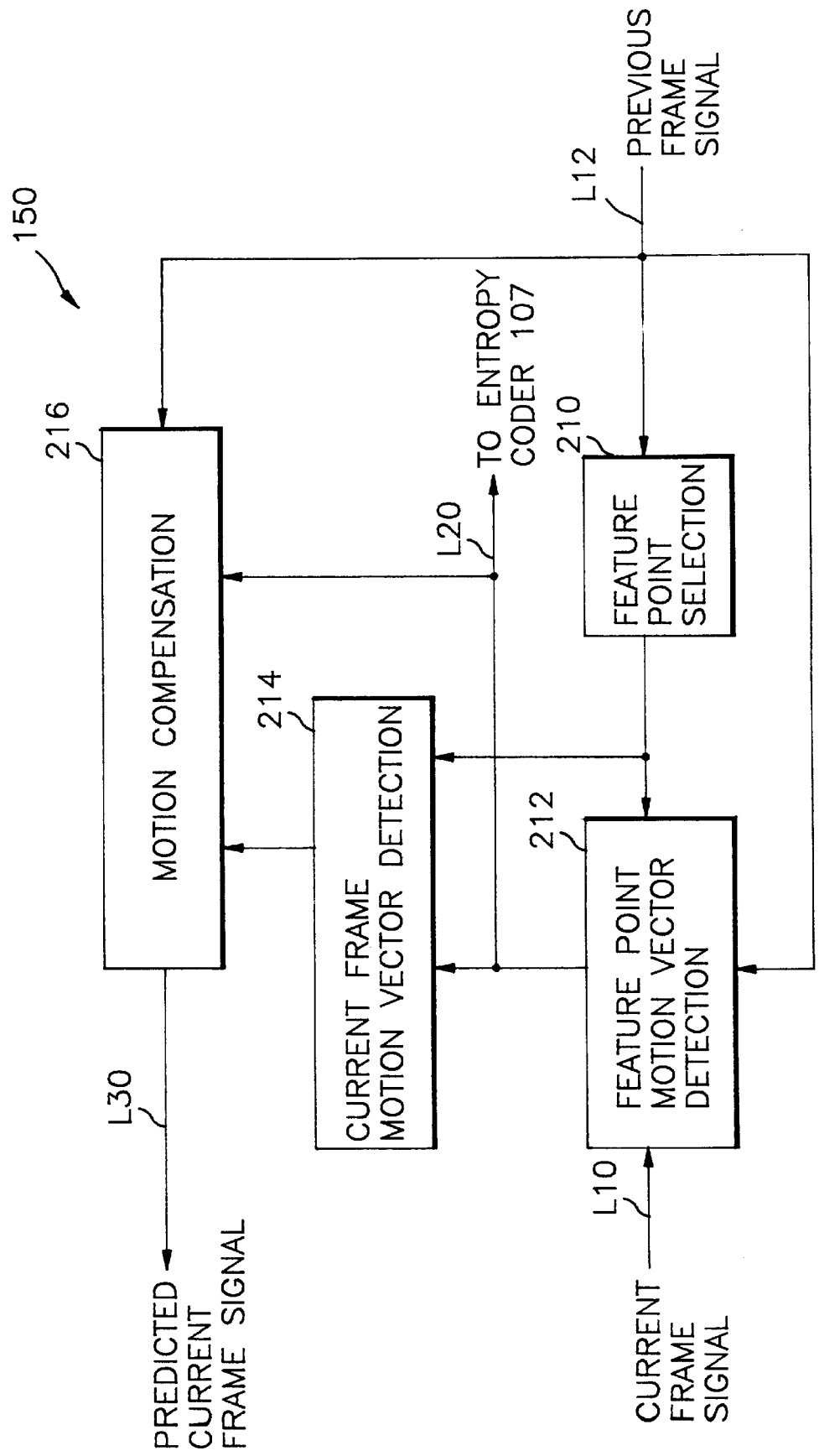
FIG. 2 shows a detailed block diagram of the current frame prediction block of FIG. 1.

Referring to FIG. 2, there are illustrated details of the current frame prediction block 150 shown in FIG. 1. As shown in FIG. 2, a previous frame signal on the line L12 from the second frame memory 124 is inputted to a feature point selection block 210, a feature point motion vector detection block 212 and a motion compensation block 216.

Figure 3:
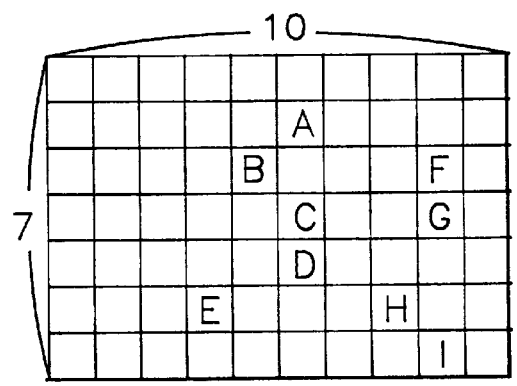
FIG. 3 describes an exemplary frame to define feature points.

At the feature point selection block 210, a number of feature points are selected among the pixels contained in the previous frame. Each of the feature points is defined as a position of a pixel which is capable of representing the motion of an object in the frame. Referring to FIG. 3, there is shown an exemplary frame of 10×7 pixels. If an moving object exists around the center of the frame and the motion of the moving object is successfully represented by a set of pixels "A" to "I", these pixels are selected as the feature points of the frame.

Figure 4A:
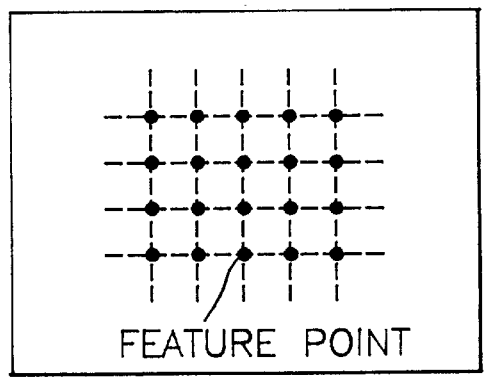
FIGS. 4A and 4B illustrate two types of grids to select feature points.
Figure 4B:
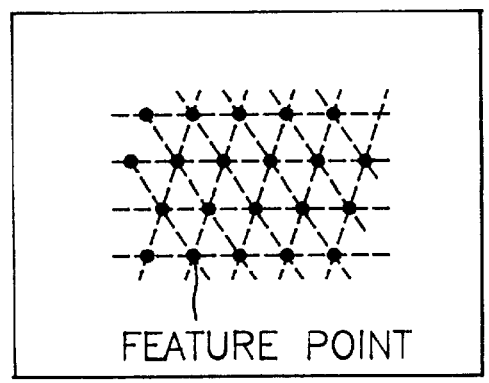

In a preferred embodiment of the present invention, the feature points are determined by a grid technique employing various types of grid, e.g., a rectangular grid or a hexagonal grid shown in FIGS. 4A and 4B, respectively. As shown in FIGS. 4A and 4B, the feature points are located at the nodes of the grids.

Figure 5A:
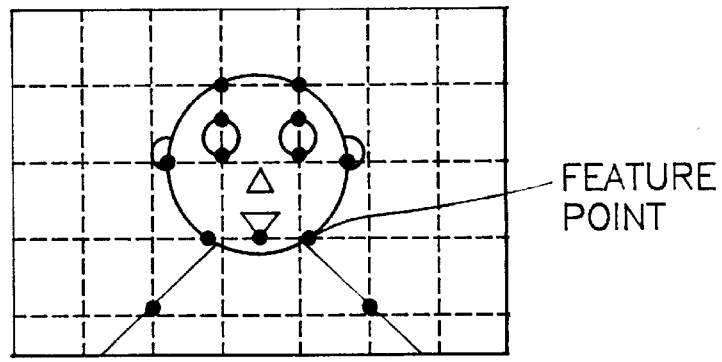
FIGS. 5A and 5B represent a technique to select feature points through the use of grids and edges.
Figure 5B:
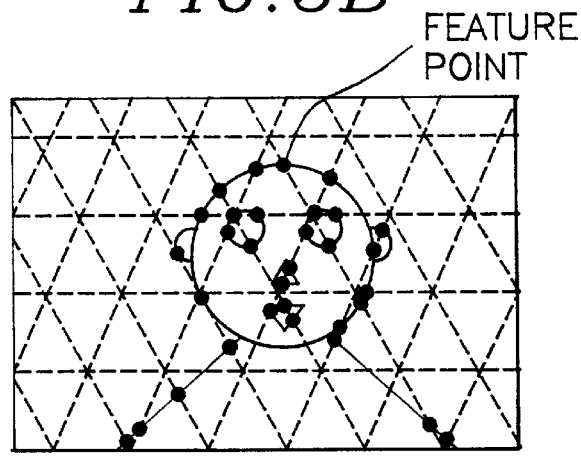

In another preferred embodiment of the invention, an edge detection technique is employed together with the above described grid technique as shown in FIGS. 5A and 5B. In this technique, intersection points of the grid and the edge of the moving object are selected as feature points.

Referring back to FIG. 2, the selected feature points from the feature point selection block 210 are inputted to a feature point motion vector detection block 212 and a current frame motion vector detection block 214. And the current frame signal on the line L10 is provided to the feature point motion vector detection block 212.

At the feature point motion vector detection block 212, a first set of motion vectors for each of the selected feature points is detected. Each of the motion vectors of the first set is a spatial displacement between a feature point in the previous frame and a most similar pixel thereto in the current frame.

There are many processing algorithms to detect the motion vectors on a pixel-by-pixel basis. In the preferred embodiments of the invention, there is used a block matching algorithm: when a feature point is received from the feature point selection block 210, a feature point block having the feature point at the center thereof, e.g., 5×5 pixels of the previous frame, is retrieved via the line L12 from the second frame memory 124(shown in FIG. 1). Thereafter, a feature point motion vector for the feature point block is determined after a similarity calculation between the feature point block and each of a plurality of equal-sized candidate blocks included in a generally larger search region, e.g., 10×10 pixels of current frame retrieved from the first frame memory 100(shown in FIG. 1).

After detecting the motion vectors for all of the feature points, the first set of motion vectors is provided from the feature point motion vector detection block 212 to a current frame motion vector detection block 214 and the entropy coder 107(shown in FIG. 1) via the line L20. In the current frame motion vector detection block 214, a second set of motion vectors for all of the pixels contained in the current frame is determined through the use of the first set of motion vectors and the feature point information from the feature point selection block 210. In order to determine the second set of motion vectors, first, a third set of vectors for "quasi-feature points", which represent pixel points of the current frame shifted from the feature points of the previous frame by the first set of motion vectors, is determined. The magnitude of a motion vector for a quasi-feature point is identical to that of the motion vector for its corresponding feature point but the directions of the two motion vectors is opposite. After determining the third set of motion vectors for all of the quasi-feature points, a fourth set of motion vectors for non-quasi-feature points, which are the remaining pixel points in the current frame, is determined as follows.

Figure 6:
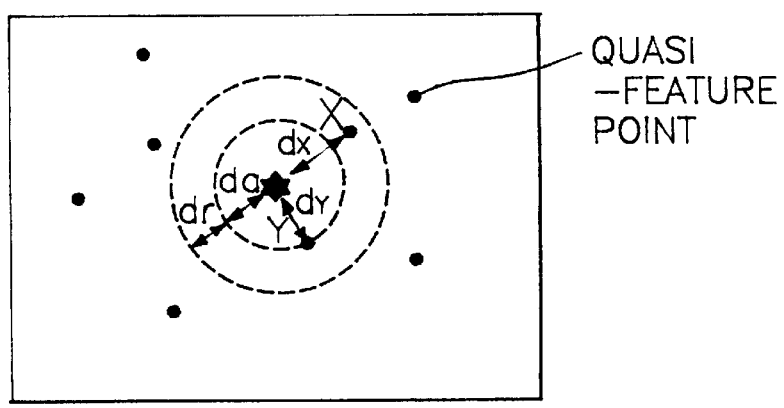
FIG. 6 depicts a method of detecting a motion vector for a non-quasi-feature point.

As shown in FIG. 6, a number of quasi-feature points are irregularly distributed in the entire current frame. A motion vector for a star marked non-quasi-feature point is determined by averaging motion vectors of the quasi-feature points which are placed within a predetermined range about the star marked non-quasi-feature point, e.g., a circular boundary having a radius, wherein the radius includes a first segment and a second segment of "dr+da": "da" is the distance to the nearest quasi-feature point from the star marked pixel position; and "dr" is a predetermined expanded radial distance for including other feature points to be used in the motion vector calculation. In one embodiment of the present invention, the predetermined range is determined such that "da" is determined and then "dr" is expended by a predetermined distance.

For example, if the nearest feature point is "Y", and the feature point "X" is located within the boundary of "da+dr", the motion vector $(MV_x, MV_y)$ for the star marked non-quasi-feature point is calculated as:

$$(MV_x, MV_y) = \frac{\frac{1}{d_x}(MV_x, MV_y)_X + \frac{1}{d_y}(MV_x, MV_y)_Y}{\frac{1}{d_X} + \frac{1}{d_Y}}$$

wherein $d_X$ and $d_Y$ are the distances of quasi-feature points X and Y from the star marked pixel position, respectively. And, $(MV_x, MV_y)_X$ and $(MV_x, MV_y)_Y$ are the respective motion vectors for the quasi-feature points.

Referring back to FIG. 2, the second set of motion vectors for all the pixels contained in the current frame, including the third set of motion vectors for quasi-feature points and the fourth set of motion vectors for non-quasi feature points are provided to the motion compensation block 216. In the motion compensation block, each value of the pixels to be contained in a predicted current frame is retrieved from the second frame memory 124(shown in FIG. 1) by using each of the motion vectors contained in the second set.

In a decoder corresponding to the encoder of the present invention, the motion prediction block is of a similar structure to that of FIG. 2 except that there is no motion estimator such as the feature point motion vector detection block 212 as shown in FIG. 2, because the feature point motion vectors transmitted from the encoder are provided thereto. The prediction block includes a feature point selection block, a current frame motion vector detection block and a motion compensation block whose functions are the same as those explained with respect to the encoder above.

Further, a previous frame signal from a frame memory of the decoder is inputted to the feature point selection block to select a number of feature points. The current frame motion vector detection block determines motion vectors for all of the pixels to be contained in the predicted current frame in response to the selected feature points and motion vectors transmitted from the encoder explained with reference to FIG. 2. The motion compensation block provides the predicted current frame which is the same as that of the encoder. The predicted current frame is further processed at the decoder to recover the current frame which is substantially identical to the original video signal.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for use in a motion-compensated video signal encoder, for determining a predicted current frame based on a current frame and a previous frame of a digital video signal, comprising:

means for selecting a number of feature point pixels from the previous frame, wherein each of the feature point pixels represents a pixel contained in the previous frame, the feature point pixels being capable of representing the motion of an object in the digital video signal;

means for detecting a first set of motion vectors for the feature point pixels contained in the previous frame on a pixel-by-pixel basis by using the current frame, wherein each of the first set of motion vectors is a spatial displacement between a corresponding feature point pixel in the previous frame and a most similar pixel contained in the current frame to the corresponding feature point pixel frame;

means for producing a second set of motion vectors for all of pixels contained in the current frame by using said first set of motion vectors, wherein said producing means includes:

first means for determining, by using the first set of motion vectors, a third set of motion vectors for quasi-feature point pixels contained in the current frame, wherein the quasi-feature point pixels represent a number of pixels of the current frame shifted from the feature point pixels of the previous frame by the first set of motion vectors; and second means for determining a fourth set of motion vectors for remaining pixels of the current frame by using the third set of motion vectors to produce the third and the fourth set of motion vectors as the second set of motion vectors, wherein each of the fourth set of motion vectors is determined by averaging motion vectors of quasi-feature point pixels contained in a predetermined range about a corresponding remaining pixel; and means for assigning the value of each of the pixels in the previous frame, which corresponds to one of the pixels in the current frame through one of the second set of motion vectors, as the value of said one of the pixels in the current frame, to thereby determine the predicted current frame.

2. The apparatus in accordance with claim 1, wherein said second means includes:

mean for assigning each of the remaining pixels of the current frame as a target pixel;

means for selecting one or more quasi-feature point pixels contained in a predetermined region about the target pixel; and means for averaging motion vectors for the selected quasi-feature point pixels and for assigning an averaged motion vector as a motion vector for the target pixel to generate the fourth set of motion vectors.

3. The apparatus in accordance with claim 2, wherein quasi-feature points X and Y are contained in the predetermined range and the motion vector for the target pixel is calculated as:

$$(MV_x, MV_y) = \frac{\frac{1}{d_X}(MV_x, MV_y)_X + \frac{1}{d_Y}(MV_x, MV_y)_Y}{\frac{1}{d_X} + \frac{1}{d_Y}}$$

wherein $(MV_x, MV_y)$ is the motion vector for the target pixel; $d_X$ and $d_Y$ are the distances of quasi-feature points X and Y from the target pixel position, respectively; and, $(MV_x, MV_y)_X$ and $(MV_x, MV_y)_Y$ are the respective motion vectors for the quasi-feature points X and Y.

4. The apparatus in accordance with claim 3, wherein the predetermined range is a circular boundary having a radius, wherein the radius has a first segment and a second segment and the first segment is the distance to the nearest quasi-feature point from the target pixel, and the second segment is a predetermined expanded radial distance for including other quasi-feature points.

5. The apparatus in accordance with claim 4, wherein said feature point pixels selecting means includes means for selecting a number of feature point pixels from the previous frame by using a grid method which extracts pixels located at nodes of the grid as the feature point pixels.

6. The apparatus in accordance with claim 5, wherein the grid is a rectangular grid.

7. The apparatus in accordance with claim 6, wherein the grid is a hexagonal grid.

8. The apparatus in accordance with claim 4, wherein said feature point pixels selecting means includes means for selecting a number of feature point pixels from the previous frame by using a grid and edge detection method which extracts pixels located at intersection points of the grid and the edge of the moving object as the feature point pixels.

9. A method, for use in a motion-compensated video signal encoder, for determining a predicted current frame based on a current frame and a previous frame of a digital video signal, comprising the steps of:

(a) selecting a number of feature point pixels from the previous frame, wherein each of the feature point pixels represents a pixel contained in the previous frame, the feature point pixels being capable of representing the motion of an object in the digital video signal;

(b) detecting a first set of motion vectors for the feature point pixels contained in the previous frame on a pixel-by-pixel basis by using the current frame, wherein each of the first set of motion vectors is a spatial displacement between a corresponding feature point pixel in the previous frame and a most similar pixel contained in the current frame to the corresponding feature point pixel;

(c) producing a second set of motion vectors for all of the pixels contained in the current frame by using said first set of motion vectors, wherein said step(c) includes the steps of:

(c1) determining, by using the first set of motion vectors, a third set of motion vectors for quasi-feature point pixels contained in the current frame, wherein the quasi-feature point pixels represent a number of pixels of the current frame shifted from the feature point pixels of the previous frame by the first set of motion vectors; and (c2) determining a fourth set of motion vectors for remaining pixels of the current frame by using the third set of motion vectors to produce the third and the fourth set of motion vectors as the second set of motion vectors, wherein each of the fourth set of motion vectors is determined by averaging motion vectors of quasi-feature point pixels contained in a predetermined range about a corresponding remaining pixel; and (d) assigning the value of each of the pixels in the previous frame, which corresponds to one of the pixels in the current frame through one of the second set of motion vectors, as the value of said one of the pixels in the current frame, to thereby determine the predicted current frame.

10. The method in accordance with claim 9, wherein said step(c2) includes the steps:

(c21) assigning each of the remaining pixels of the current frame as a target pixel;

(c22) selecting one or more quasi-feature point pixels contained in a predetermined region encompassing the target pixel; and (c23) averaging motion vectors for the selected quasi-feature point pixels and for assigning an averaged motion vector as a motion vector for the target pixel to generate the fourth set of motion vectors.

11. The method in accordance with claim 10, wherein quasi-feature points X and Y are contained in the predetermined range and the motion vector for the target pixel is calculated as:

$$(MV_x, MV_y) = \frac{\frac{1}{d_X}(MV_x, MV_y)_X + \frac{1}{d_Y}(MV_x, MV_y)_Y}{\frac{1}{d_X} + \frac{1}{d_Y}}$$

wherein $(MV_x, MV_y)$ is the motion vector for the target pixel; $d_X$ and $d_Y$ are the distances of quasi-feature points X and Y from the target pixel position, respectively; and, $(MV_x, MV_y)_X$ and $(MV_x, MV_y)_Y$ are the respective motion vectors for the quasi-feature points X and Y.

12. The method in accordance with claim 11, wherein the predetermined range is a circle boundary having a radius, wherein the radius has a first segment and a second segment and the first segment is the distance to the nearest quasi-feature point from the target pixel, and the second segment is a predetermined expanded radial distance for including other quasi-feature points.

13. The method in accordance with claim 12, wherein the step (a) includes the step of selecting a number of feature point pixels from the previous frame by using a grid method which extracts pixels located at nodes of the grid as the feature point pixels.

14. The method in accordance with claim 13, wherein the grid is a rectangular grid.

15. The method in accordance with claim 14, wherein the grid is a hexagonal grid.

16. The method in accordance with claim 11, wherein the step (a) includes the step of selecting a number of feature point pixels from the previous frame by using a grid and edge detection method which extracts pixels located at intersection points of the grid and the edge of the moving object as the feature point pixels.

* * * * *